(12) United States Patent
Lai et al.

(10) Patent No.: US 8,247,750 B2
(45) Date of Patent: Aug. 21, 2012

(54) CONSTRUCT FOR COOKING RAW DOUGH PRODUCT IN A MICROWAVE OVEN

(75) Inventors: Laurence M. C. Lai, Mississauga (CA); Sandra M. Tsontzidis, Brampton (CA); Tim Bing Liu, Mississauga (CA); Angela Chen Li, Milton (CA)

(73) Assignee: Graphic Packaging International, Inc., Marietta, GA (US)

( * ) Notice: Subject to any disclaimer, the term of this patent is extended or adjusted under 35 U.S.C. 154(b) by 426 days.

(21) Appl. No.: 12/383,482

(22) Filed: Mar. 25, 2009

(65) Prior Publication Data

US 2009/0246332 A1    Oct. 1, 2009

Related U.S. Application Data

(60) Provisional application No. 61/070,991, filed on Mar. 27, 2008.

(51) Int. Cl.
*H05B 6/80* (2006.01)
(52) U.S. Cl. ........ 219/730; 219/728; 219/732; 219/759; 426/107; 426/234; 426/243
(58) Field of Classification Search .......... 219/725–735, 219/759; 426/107, 234, 243, 109, 241
See application file for complete search history.

(56) References Cited

U.S. PATENT DOCUMENTS

| | | |
|---|---|---|
| 3,302,632 A | 2/1967 | Fichtner |
| 3,547,661 A | 12/1970 | Stevenson |
| 3,662,139 A | 5/1972 | Love |
| 3,865,301 A | 2/1975 | Pothier et al. |
| 3,936,626 A | 2/1976 | Moore |
| 4,013,798 A | 3/1977 | Goltsos |
| 4,020,310 A | 4/1977 | Souder, Jr. et al. |
| 4,398,994 A | 8/1983 | Beckett |
| 4,552,614 A | 11/1985 | Beckett |
| 4,558,198 A | 12/1985 | Levendusky et al. |
| 4,676,857 A | 6/1987 | Scharr et al. |
| 4,865,921 A | 9/1989 | Hollenberg et al. |
| 4,883,936 A | 11/1989 | Maynard et al. |
| 4,890,439 A | 1/1990 | Smart et al. |
| 4,896,009 A | 1/1990 | Pawlowski |
| 4,908,246 A | 3/1990 | Fredricks et al. |

(Continued)

FOREIGN PATENT DOCUMENTS

EP    0 317 203 A1    5/1989

(Continued)

OTHER PUBLICATIONS

International Search Report—PCT/US2006/023617, Jun. 16, 2006, Graphic Packaging International, Inc.

(Continued)

*Primary Examiner* — Quang Van
(74) *Attorney, Agent, or Firm* — Womble Carlyle Sandridge & Rice, LLP (57) ABSTRACT

A construct for preparing a food item in a microwave oven includes a plurality of heating regions including an inner heating region and an outer heating region. The inner heating region includes a susceptor including a plurality of annular microwave energy transparent areas, and the outer heating region includes a plurality of susceptor projections extending radially from the susceptor of the inner heating region.

49 Claims, 4 Drawing Sheets

U.S. PATENT DOCUMENTS

| | | | |
|---|---|---|---|
| 4,927,991 | A | 5/1990 | Wendt et al. |
| 4,959,120 | A | 9/1990 | Wilson |
| 4,970,358 | A | 11/1990 | Brandberg et al. |
| 4,972,059 | A * | 11/1990 | Wendt et al. .................. 219/728 |
| 5,038,009 | A | 8/1991 | Babbitt |
| 5,079,397 | A | 1/1992 | Keefer |
| 5,117,078 | A | 5/1992 | Beckett |
| 5,149,396 | A | 9/1992 | Wilson |
| 5,177,332 | A | 1/1993 | Fong |
| 5,213,902 | A | 5/1993 | Beckett |
| 5,220,143 | A | 6/1993 | Kemske et al. |
| 5,239,153 | A | 8/1993 | Beckett |
| 5,254,821 | A | 10/1993 | Walters |
| 5,260,537 | A | 11/1993 | Beckett |
| 5,278,378 | A | 1/1994 | Beckett |
| RE34,683 | E | 8/1994 | Maynard et al. |
| 5,352,465 | A | 10/1994 | Gondek et al. |
| 5,354,973 | A | 10/1994 | Beckett |
| 5,391,864 | A | 2/1995 | Bodor et al. |
| 5,410,135 | A | 4/1995 | Pollart et al. |
| 5,424,517 | A | 6/1995 | Habeger, Jr. et al. |
| 5,466,917 | A | 11/1995 | Matsuki et al. |
| 5,519,195 | A | 5/1996 | Keefer et al. |
| 5,530,231 | A | 6/1996 | Walters et al. |
| 5,585,027 | A | 12/1996 | Young |
| 5,698,127 | A | 12/1997 | Lai et al. |
| 5,759,422 | A | 6/1998 | Schmelzer et al. |
| 5,800,724 | A | 9/1998 | Habeger et al. |
| 5,864,123 | A | 1/1999 | Keefer |
| 6,114,679 | A | 9/2000 | Lai et al. |
| 6,133,560 | A | 10/2000 | Zeng et al. |
| 6,150,646 | A | 11/2000 | Lai et al. |
| 6,251,451 | B1 | 6/2001 | Zeng |
| 6,414,290 | B1 | 7/2002 | Cole et al. |
| 6,433,322 | B2 | 8/2002 | Zeng et al. |
| 6,677,563 | B2 | 1/2004 | Lai |
| 6,717,121 | B2 | 4/2004 | Zeng et al. |
| 6,765,182 | B2 | 7/2004 | Cole et al. |
| 7,019,271 | B2 | 3/2006 | Wnek |
| 7,022,959 | B2 | 4/2006 | Cole et al. |
| 7,351,942 | B2 | 4/2008 | Wnek |
| 2003/0085233 | A1 | 5/2003 | Winkleman |
| 2005/0042360 | A1 | 2/2005 | Tiffany et al. |
| 2006/0049190 | A1 | 3/2006 | Middleton |
| 2006/0138128 | A1 | 6/2006 | Cole |
| 2006/0289522 | A1 | 12/2006 | Middleton et al. |
| 2007/0023426 | A1 * | 2/2007 | Russell et al. ................ 219/730 |
| 2009/0184111 | A1 | 7/2009 | Russell et al. |
| 2009/0246332 | A1 | 10/2009 | Lai et al. |

FOREIGN PATENT DOCUMENTS

| | | |
|---|---|---|
| EP | 0 336 325 A2 | 10/1989 |
| GB | 2 280 342 A | 1/1995 |
| WO | WO 89/11772 | 11/1989 |
| WO | WO 93/09945 | 5/1993 |
| WO | WO 98/08752 | 3/1998 |
| WO | WO 98/35887 | 8/1998 |
| WO | WO 01/23275 | 4/2001 |
| WO | WO 03/066435 A2 | 8/2003 |
| WO | WO 2006/138645 | 12/2006 |

OTHER PUBLICATIONS

Written Opinion—PCT/US2006/023617, Jun. 16, 2006, Graphic Packaging International, Inc.

* cited by examiner

CONSTRUCT FOR COOKING RAW DOUGH PRODUCT IN A MICROWAVE OVEN

CROSS-REFERENCE TO RELATED APPLICATION

This application claims the benefit of U.S. Patent Application No. 61/070,991, filed Mar. 27, 2008, which is incorporated by reference herein in its entirety.

TECHNICAL FIELD

This disclosure relates to a construct for heating or cooking a food item in a microwave oven. In particular, this disclosure relates to a construct for preparing a food item in a microwave oven, where the food item is made from a raw batter or dough.

BACKGROUND

Many food items can be prepared successfully and conveniently in a microwave oven. Most commercially available microwavable foods are pre-cooked or pre-baked and are reheated in the microwave oven in a package designed to address the heating needs of the particular food item. For example, items that are desirably browned and/or crisped often are cooked in a package including a susceptor, i.e., a thin layer of microwave energy interactive material (generally less than about 100 angstroms in thickness, for example, from about 60 to about 100 angstroms in thickness, having an optical density of from about 0.15 to about 0.35, for example, about 0.21 to about 0.28) that tends to absorb at least a portion of impinging microwave energy and convert it to thermal energy (i.e., heat) at the interface with the food item.

Although susceptors have been used to prepare numerous pre-cooked food items, susceptors generally have not been successfully used to prepare a food item from a raw dough or batter. Such items present unique challenges because the food item typically expands or changes shape as the dough or batter transforms from a raw state to a cooked or baked state. For example, when raw cookie dough is heated, the dough expands outwardly to an expected final size. Prior to reaching its expected size, the peripheral areas of the susceptor (not in contact with the dough) are prone to overheating. As a result, the edges of the resulting food item may become charred while the center of the food item may still be raw. At the same time, the bottom of the food item overlying the central area of the susceptor may become overheated due to prolonged exposure to the heat generated by the susceptor.

Thus, there is a need for a construct for preparing a food item from a raw dough in a microwave oven, where the construct accommodates the heating requirements of an expanding dough and provides the desired degree of heating, browning, and/or crisping of the resulting food item.

SUMMARY

The present disclosure is directed to various constructs for preparing a food item from a raw batter or dough in a microwave oven. In one example, the construct comprises a substantially planar, dimensionally stable card or disk formed, for example, from paperboard or another suitable material, that includes an arrangement of microwave energy interactive elements that alter the effect of microwave energy on the dough and resulting food item. In one example, the microwave energy interactive element comprises a susceptor, which may be supported on a polymer film. The susceptor may include (e.g., surround or circumscribe) a plurality of microwave energy transparent areas adapted to moderate the heating power of the susceptor and to provide direct heating of the dough. The various microwave energy interactive areas and microwave energy transparent areas may be arranged to define a plurality of heating regions or zones, each of which may be configured to provide a desired degree of heating, browning, and/or crisping of the expanding dough and/or resulting food item, while minimizing overheating and/or damage to the construct itself.

Various other features, aspects, and embodiments of the present invention will be apparent from the following description and accompanying figures.

BRIEF DESCRIPTION OF THE DRAWINGS

The description refers to the accompanying drawings in which like reference characters refer to like parts throughout the several views, and in which:

FIGS. 1A-1H and FIG. 2 are all illustrative of an exemplary embodiment of this disclosure.

DESCRIPTION

Figure 1A:
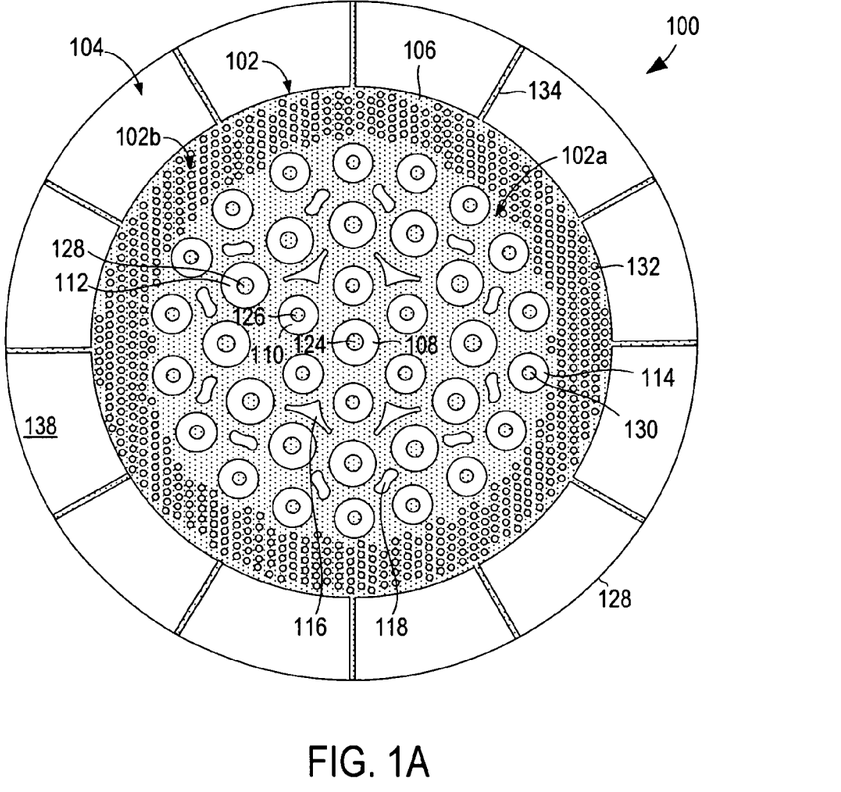
FIG. 1A is a schematic top plan view of an exemplary construct that may be used to prepare a food item from raw dough in a microwave oven.

FIG. 1A is a schematic top plan view of a construct (e.g. disk) 100 that may be used to prepare a food item from raw dough or batter. For purposes of discussion, and not limitation, the construct 100 may be generally characterized as having a plurality of heating regions. Each heating region may include microwave energy transparent areas ("METAs") that allow the passage of microwave energy therethrough, microwave energy interactive areas, or a combination thereof. The relative area of METAs and microwave energy interactive areas in each heating region may be adjusted as needed to achieve the desired heating, browning, and/or crisping of the food item, while ensuring that the construct does not overheat, particularly in areas that are not covered by the dough. It will be understood that the precise dimensions and configuration of each particular microwave energy interactive element and each META of a construct may depend on numerous factors, including the type and formulation of the raw food item, the intended degree of heating, browning, and/or crisping, the desired mass and dimensions of the resulting food item, and/or any other suitable factor.

In this example, the construct 100 generally includes an inner heating region 102 and an outer or peripheral heating region 104. The inner heating region 102 is substantially circular in shape, and the outer heating region 104 is substantially annular in shape (i.e., shaped like an annulus), suitable for preparing a food item having a generally circular shape, for example, a cookie or pancake. However, differently shaped heating regions may be used, depending on the food item to be prepared. For example, circular features of the construct 100 can have other shapes, such as oblong, elliptical, or any other suitable regular or irregular shape.

The inner heating region 102 generally includes a susceptor 106 (shown schematically with stippling in the figures) and a plurality of METAs 108, 110, 112, 114, 116, 118 (only some of which are labeled) within (i.e., surrounded or circumscribed by) the susceptor. METAs 108, 110, 112, 114 are substantially annular in shape, METAs 116 are somewhat triangular in shape with incurvate sides and rounded corners, and METAs 118 are substantially bilobal in shape, generally resembling a peanut or dogbone. The various METAs may be formed in any suitable manner, as will be discussed further below.

Still viewing FIG. 1A, annular METAs 110, 112, 114 are arranged in a plurality of substantially concentric rings around annular META 108, which may be substantially centered within the inner heating region 102. Annular METAs 110 are arranged in a first ring (also generally referred to as ring 110), annular METAs 112 are arranged in a second ring (also generally referred to as ring 112), and annular METAs 114 are arranged in a third ring (also generally referred to as ring 114). The triangular METAs 116 are disposed between the first ring 110 and the second ring 112, and the bilobal METAs 118 are disposed between the second ring 112 and the third ring 114.

Figure 1B:
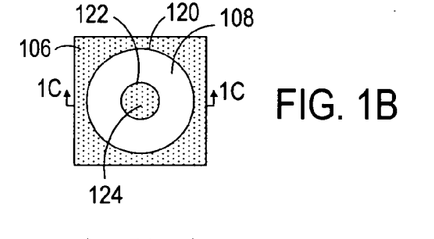
FIG. 1B is a schematic enlarged view of a portion of the construct.
Figure 1C:
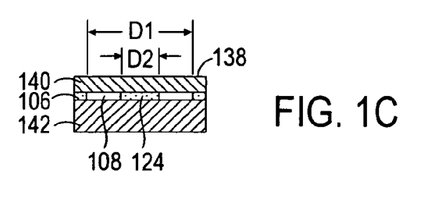
FIG. 1C is a schematic cross-sectional view of the portion of the construct illustrated in FIG. 1B, taken along a line 1C-1C and showing the cross-section only.

As best seen in FIGS. 1B and 1C (showing only META 108), each of the annular METAs 108, 110, 112, 114 has an outer periphery 120 and an inner periphery 122 that are both substantially circular in shape. The diameter D1 of the outer periphery 120 is a major linear dimension (i.e., outer diameter) of the respective annular META 108. The diameter D2 of the inner periphery 122 is a minor linear dimension (i.e., inner diameter) of the respective annular META 108. In this example, each META 110, 112, 114 within a particular respective ring 110, 112, 114 has approximately the same major and minor linear dimensions (FIG. 1A). The centermost annular META 108 and each META 112 have approximately the same major and minor linear dimensions, and METAs 110, 114 have approximately the same major and minor linear dimensions.

Although countless other dimensions and arrangements are contemplated, in each of various particular examples, each META 108, 112 independently may have an outer diameter of from about 0.05 to about 1 in., from about 0.08 to about 0.7 in., or from about 0.1 to about 0.5 in., for example, about 0.3 in. Each META 108, 112 may have an inner diameter of from about 0.02 to about 0.8 in., from about 0.05 to about 0.5 in., or from about 0.08 to about 0.3 in., for example, about 0.12 in.

Likewise, in each of various particular examples, each META 110, 114 independently may have an outer diameter of from about 0.05 to about 1 in., from about 0.08 to about 0.7 in., or from about 0.1 to about 0.5 in., for example, about 0.24 in. Each META 110, 114 may have an inner diameter of from about 0.02 to about 0.8 in., from about 0.05 to about 0.5 in., or from about 0.08 to about 0.3 in., for example, about 0.10 in.

It will be recognized that the inner periphery 122 of each annular META 108, 110, 112, 114 circumscribes a respective portion of the susceptor 106, such that the circumscribed portion of the susceptor 106 resembles a respective substantially circular "island" 124, 126, 128, 130 substantially centered within the outer periphery 122 of the respective META 108, 110, 112, 114. Each susceptor island 124, 126, 128, 130 has a major linear dimension D2 (e.g., diameter) approximately equal to the inner diameter D2 of the surrounding annular META 108, 110, 112, 114, for example, as shown with META 108 in FIGS. 1B and 1C. Alternatively, the annular META can be viewed as having a generally circular shape with a diameter of D1 with the susceptor island having a diameter D2 disposed within the respective annular META.

In the illustrated embodiment, susceptor islands 124, 128 have approximately the same major linear dimension (e.g., diameter), while susceptor islands 126, 130 have approximately the same major linear dimension (e.g., diameter). However, the relative dimensions of each susceptor island and the surrounding annular META may be adjusted as needed to provide the desired balance between heating, browning, and crisping, as needed for a particular food item. In each of various specific examples, susceptor islands 124, 128 independently may have a major linear dimension, for example, a diameter, of from about 0.02 to about 0.8 in., from about 0.05 to about 0.5 in., or from about 0.08 to about 0.3 in., for example, about 0.1 in. Susceptor islands 126, 130 independently may have a major linear dimension, for example, a diameter, of from about 0.02 to about 0.8 in., from about 0.05 to about 0.5 in., or from about 0.08 to about 0.3 in., for example, about 0.1 in. However, numerous other shapes, dimensions, and arrangements are contemplated.

Still viewing FIG. 1A, the outermost portion of the inner heating region 102 further includes a plurality of relatively small, substantially circular METAs 132 arranged in an annulus or ring-like configuration between the third ring of annular METAs 114 and the outer (or peripheral) heating region 104. This portion of the construct 100 may be referred to as the medial heating region 102$b$, with the remainder of the inner heating region (i.e., the portion including METAs 108, 110, 112, 114, 116, 118) being referred to as the central heating region 102$a$. It will be understood that the regions 102$a$, 102$b$ are contiguous to one another and may overlap to some extent, such that there is no precise boundary between them. Thus, such characterizations are for purposes of discussion only, and are not to be construed as limiting in any manner.

Figure 1D:
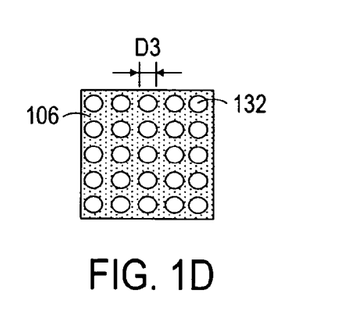
FIG. 1D is a schematic enlarged view of another portion of the construct.

The circular METAs 132 in the medial heating region 102$b$ are arranged in a closely spaced, tiled configuration with one another within the ring (also generally referred to as ring 132), as shown in FIG. 1D, which shows only a portion of the medial region 102$b$. Although numerous configurations are contemplated, the circular METAs generally have a major linear dimension (e.g., a diameter) D3 less than the respective major linear dimensions of the annular METAs 108, 110, 112, 114, and in some cases, also less than the major linear dimension of the various susceptor islands 124, 126, 128, 130. In each of various particular examples, the METAs 132 may each have a major linear dimension, for example, a diameter, of from about 0.01 to about 0.3 in., from about 0.02 to about 0.1 in., or from about 0.02 to about 0.08 in., for example, about 0.04 in. However, numerous other shapes, dimensions, and arrangements may be used.

Returning to FIG. 1A, the outer or peripheral heating region 104 is generally transparent to microwave energy, except for a plurality of substantially rectangular or elongate susceptor areas or projections 134 that resemble spokes or rods extending radially outward from the susceptor 106 of the inner heating region 102 (specifically, from the medial heating region 102$b$) towards, and in some cases, substantially abutting the peripheral edge 136 of the construct 100. In each of various particular examples, each susceptor projection 134 may have a major linear dimension, for example, a length, of from about 0.1 to about 2 in., from about 0.2 to about 1 in., or from about 0.3 to about 0.8 in., for example, about 0.5 in., and a width of from about 0.005 to about 0.5 in., from about 0.008 to about 0.1 in., or from about 0.01 to about 0.05 in., for example, about 0.035 in. However, numerous other shapes, dimensions, and arrangements may be suitable.

As stated above, each of the various heating regions 102a, 102b, 104 (or 102, 104) may be configured to attain a desired level of heating, browning, and/or crisping of the expanding dough. For example, each heating region may include a total percent susceptor area and a total percent META, as calculated using values obtained from a top plan view of the construct 100 (e.g., see FIG. 1A).

In each of various independent examples, the central heating region 102a may comprise from about 30% to 100% susceptor area, from about 40% to about 80% susceptor area, or from about 50% to about 75% susceptor area, for example, about 60% susceptor area. Conversely, the central heating region 102a may comprise from 0% to about 70% META, from about 20% to about 60% META, or from about 25% to about 50% META, for example, about 40% META.

In one specific example with only annular METAs (i.e., without the triangular METAs 116 or bilobal METAs 118), the center region 102a may comprise from about 30% to 100% susceptor area, from about 40% to about 80% susceptor area, or from about 50% to about 75% susceptor area, for example, about 66% susceptor area. Conversely, the center region 102a may comprise from 0% to about 70% META, from about 20% to about 60% META, or from about 25% to about 50% META, for example, about 34% META.

In each of various independent examples, the medial heating region 102b may comprise from about 5% to about 50% susceptor area, from about 10% to about 40% susceptor area, or from about 15% to about 25% susceptor area, for example, about 20% susceptor area. Conversely, the medial heating region 102b may comprise from about 50% to about 95% META, from about 60% to about 90% META, or from about 75% to about 85% META, for example, about 80% META.

In each of various independent examples, the peripheral heating region 104 may comprise from 0% to about 20% susceptor area, from about 0.5% to about 10% susceptor area, or from about 1% to about 5% susceptor area, for example, about 2% susceptor area. Conversely, the peripheral heating region 104 may comprise from about 80% to about 100% META, from about 90% to about 99.5% META, or from about 95% to about 99% META, for example, about 98% META.

In one particular example, the center heating region 102a comprises about 61% susceptor area, the medial heating region 102b comprises about 20% susceptor area, and the peripheral heating region 104 comprises about 1.8% susceptor area. In such an example, the center heating region 102a conversely comprises about 39% META, the medial heating region 102b comprises about 80% META, and the peripheral heating region 104 comprises about 98.2% META.

Figure 1E:
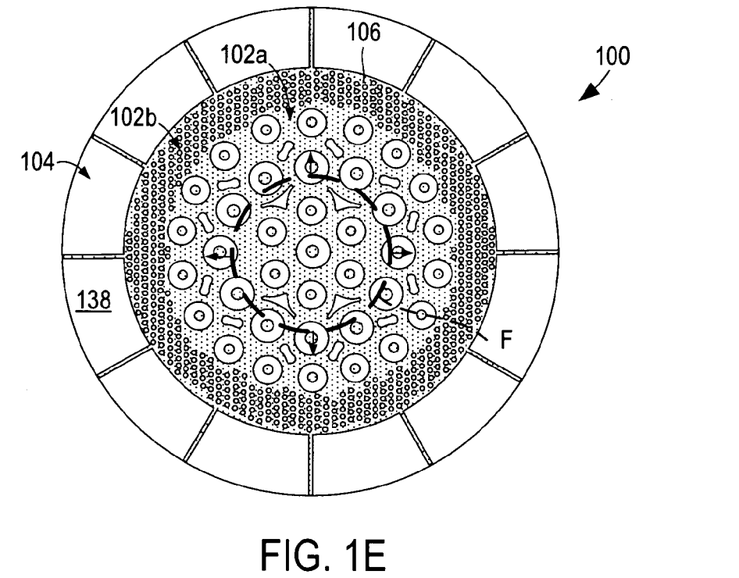
FIGS. 1E-1H schematically illustrate various aspects of the construct of FIG. 1A in use.
Figure 1F:
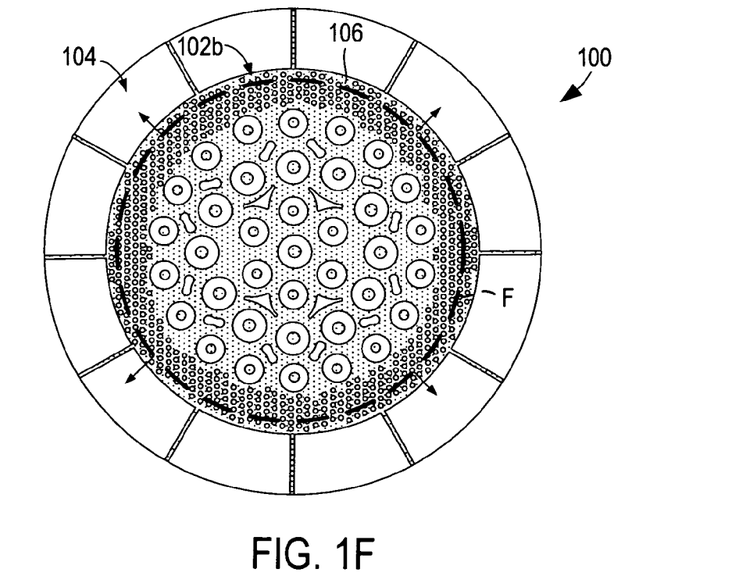
Figure 1G:
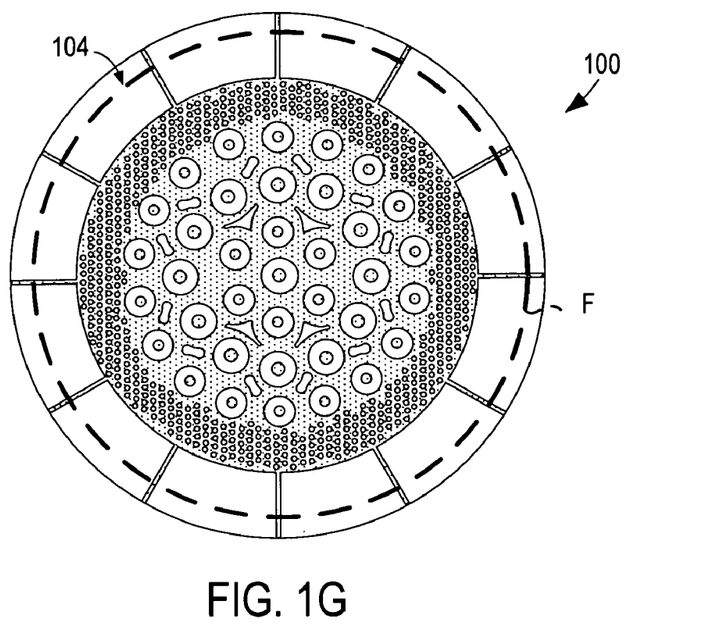

Turning to FIGS. 1E-1G, to use the construct 100 according to one exemplary method, raw dough F (shown schematically with dashed lines) is placed on a food-contacting surface 138 of the construct 100 and placed into a microwave oven (not shown). Typically, the dough F is provided in the shape of a clump or ball that may be situated on the construct 100 such that the dough covers a centermost portion of the central heating region 102a (i.e., is substantially centered within the central heating region 102a). Upon sufficient exposure to microwave energy, the susceptor 106 converts at least a portion of the impinging microwave energy to thermal energy, which then can be transferred to the adjacent dough F. At least partially as a result, the dough F begins to heat and expand outwardly in the direction of the arrows (FIG. 1E).

As will be evident, the dough and/or resulting food item F remains in contact the central portion of the central heating region 102a for the entirety of the heating cycle. Accordingly, METAs 108, 110, 112, 114, 116, 118 (FIG. 1A) are provided within the central heating region 102a to moderate the heating power of the susceptor 106 and reduce the intensity of browning as compared with a solid susceptor (i.e., a susceptor with no METAs), and to provide direct heating of the dough. At the same time, the susceptor islands 124, 126, 128, 130 (FIG. 1A) within each META 108, 110, 112, 114 provide more uniform browning and/or crisping of the bottom of the food item F and help to prevent the formation of unbrowned areas that may be perceived poorly by a consumer.

As the dough F spreads into the medial heating region 102b (FIG. 1F), the ring of substantially circular METAs 132 moderates the heating power of the susceptor 106 and helps to prevent premature and/or excessive browning of the food item F and/or crazing of the susceptor 106.

Finally, as the dough F reaches the peripheral heating region 104 (FIG. 1G), the susceptor projections 134 provide additional, but relatively minimal, additional browning and/or crisping of the bottom surface of the food item F. As with the medial heating region 102, the microwave energy transparent portion of the peripheral heating region 104 helps to prevent premature and/or excessive browning of the food item F and/or crazing of the susceptor 134. The resulting food item generally has a substantially solid consistency and is typically browned and/or crisped properly and more evenly than can be achieved with a solid susceptor.

Although the heating cycle is described with respect to particular circumferential heating zones encountered by the expanding dough, it will be understood that the radial expansion of the dough is gradual, such that even incremental growth in the dough area may expose the surface of the dough adjacent to the construct to a new combination of METAs and microwave energy interactive areas. Further, it will be understood that depending on the arrangement of METAs and microwave energy interactive areas, various circumferential portions of the expanding dough may be exposed to different degree of heating, browning, and crisping.

Figure 1H:
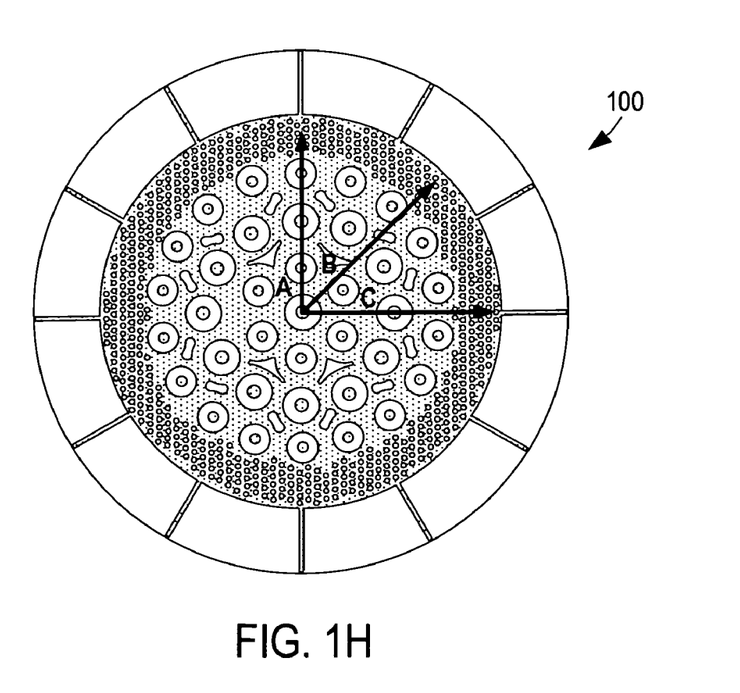

By way of example and not limitation, FIG. 1H illustrates a plurality of radial paths A, B, C that various portions of the dough may encounter as it expands. As will be evident from FIG. 1H, in this example, following each of paths A, B, C, the dough encounters alternating areas of heating (i.e., when the expanding dough overlies a META) and browning and/or crisping (i.e., when the expanding dough overlies a portion of the susceptor). However, each path results in a different combination of heating, browning, and crisping areas, and therefore, different rates and times for heating, browning, and crisping. Thus, the construct could be viewed as including countless contiguous and/or overlapping heating zones, both circumferential and radial, each of which may expose the dough to a different degree of heating, browning, and/or crisping. Such zones may generally be arranged to provide the desired degree of heating, browning, and/or crisping in the resulting cooked food item.

Numerous other constructs are encompassed by the disclosure. For example, although the exemplary construct illustrated in the figures is substantially circular in shape, the construct may have any regular or irregular shape and/or configuration, as needed or desired for a particular application. Likewise, the construct have any suitable dimensions, depending on the type of food item being heated, the desired heating time, the desired degree of browning and/or crisping, or any other suitable criteria. Further, the construct may include one or more sidewalls that define a shaped food item from the raw dough or batter.

Any of such constructs may be formed from various materials, provided that the materials are substantially resistant to softening, scorching, combusting, or degrading at typical microwave oven heating temperatures, for example, at from about 250° F. to about 425° F. The materials may include microwave energy interactive materials, for example, those used to form susceptors and other microwave energy interactive elements, and microwave energy transparent or inactive materials, for example, those used to form the remainder of the construct.

The microwave energy interactive material may be an electroconductive or semiconductive material, for example, a metal or a metal alloy provided as a metal foil; a vacuum deposited metal or metal alloy; or a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide, for example, oxides of aluminum, iron, and tin, optionally used in conjunction with an electrically conductive material. Another metal oxide that may be suitable is indium tin oxide (ITO). ITO has a more uniform crystal structure and, therefore, is clear at most coating thicknesses.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

While susceptors are illustrated herein, the construct alternatively or additionally may include a foil or high optical density evaporated material having a thickness sufficient to reflect a substantial portion of impinging microwave energy. Such elements are typically formed from a conductive, reflective metal or metal alloy, for example, aluminum, copper, or stainless steel, in the form of a solid "patch" generally having a thickness of from about 0.000285 inches to about 0.05 inches, for example, from about 0.0003 inches to about 0.03 inches. Other such elements may have a thickness of from about 0.00035 inches to about 0.020 inches, for example, 0.016 inches.

Larger microwave energy reflecting elements may be used where the food item is prone to scorching or drying out during heating. Smaller microwave energy reflecting elements may be used to diffuse or lessen the intensity of microwave energy. A plurality of smaller microwave energy reflecting elements also may be arranged to form a microwave energy directing element to direct microwave energy to specific areas of the food item. If desired, the loops may be of a length that causes microwave energy to resonate, thereby enhancing the distribution effect. Microwave energy distributing elements are described in U.S. Pat. Nos. 6,204,492, 6,433,322, 6,552,315, and 6,677,563, each of which is incorporated by reference in its entirety.

If desired, any of the numerous microwave energy interactive elements described herein or contemplated hereby may be substantially continuous, that is, without substantial breaks or interruptions, or may be discontinuous, for example, by including one or more breaks or apertures that transmit microwave energy therethrough, as illustrated above with respect to susceptor 106. The breaks or apertures may be sized and positioned to heat particular areas of the food item selectively. The breaks or apertures may extend through the entire structure, or only through one or more layers. The number, shape, size, and positioning of such breaks or apertures may vary for a particular application depending on the type of construct being formed, the food item to be heated therein or thereon, the desired degree of shielding, browning, and/or crisping, whether direct exposure to microwave energy is needed or desired to attain uniform heating of the food item, the need for regulating the change in temperature of the food item through direct heating, and whether and to what extent there is a need for venting.

It will be understood that the aperture may be a physical aperture or void in one or more layers or materials used to form the construct, or may be a non-physical "aperture" (e.g., METAs 108, 110, 112, 114, 116, 118, 132). A non-physical aperture is a microwave energy transparent area that allows microwave energy to pass through the structure without an actual void or hole cut through the structure. Such areas may be formed by simply not applying a microwave energy interactive material to the particular area, or by removing microwave energy interactive material in the particular area, or by chemically and/or mechanically deactivating the microwave energy interactive material in the particular area. While both physical and non-physical apertures allow the food item to be heated directly by the microwave energy, a physical aperture also provides a venting function to allow steam or other vapors to escape from the interior of the construct.

The arrangement of microwave energy interactive and microwave energy transparent areas may be selected to provide various levels of heating, as needed or desired for a particular application, as illustrated above. For example, where greater heating is desired, the total inactive (i.e., microwave energy transparent) area may be increased. In doing so, more microwave energy is transmitted to the food item. Alternatively, by decreasing the total inactive area, more microwave energy is absorbed by the microwave energy interactive areas, converted into thermal energy, and transmitted to the surface of the food item to enhance browning and/or crisping.

In some instances, it may be beneficial to create one or more discontinuities or inactive regions to prevent overheating or charring of the construct, for example, as discussed in connection with the medial and peripheral regions 102b, 104 of the construct 100 of FIG. 1A. Such areas may be formed by forming these areas of the construct 100 without a microwave energy interactive material, by removing any microwave energy interactive material that has been applied, or by deactivating the microwave energy interactive material in these areas, as discussed above.

Further still, one or more panels, portions of panels, or portions of the construct may be designed to be microwave energy inactive to ensure that the microwave energy is focused efficiently on the areas to be browned and/or crisped, rather than being lost to portions of the food item not intended to be browned and/or crisped or to the heating environment. This may be achieved using any suitable technique, such as those described above.

If desired, the microwave energy interactive element may be supported on a microwave inactive or transparent substrate 140 (FIG. 1C), for example, a polymer film or other suitable polymeric material, for ease of handling and/or to prevent contact between the microwave energy interactive material and the food item. The outermost surface of the polymer film 140 may define at least a portion of the food-contacting surface 138 of the construct 100, as indicated in FIGS. 1A and 1C. Examples of polymer films that may be suitable include, but are not limited to, polyolefins, polyesters, polyamides, polyimides, polysulfones, polyether ketones, cellophanes, or any combination thereof. In one particular example, the polymer film comprises polyethylene terephthalate. The thickness of the film generally may be from about 35 gauge to about 10 mil. In each of various examples, the thickness of the film may be from about 40 to about 80 gauge, from about 45 to about 50 gauge, about 48 gauge, or any other suitable thickness. Other non-conducting substrate materials such as paper and paper laminates, metal oxides, silicates, cellulosics, or any combination thereof, also may be used.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item. For example, the microwave energy interactive material may be provided as a continuous or discontinuous layer or coating including circles, loops, hexagons, islands, squares, rectangles, octagons, and so forth.

Various materials may serve as the base material 142 (FIG. 1C) for the construct 100. For example, the construct may be formed at least partially from a polymer or polymeric material. As another example, all or a portion the construct may be formed from a paper or paperboard material. In one example, the paper has a basis weight of from about 15 to about 60 lbs/ream (lb/3000 sq. ft.), for example, from about 20 to about 40 lbs/ream. In another example, the paper has a basis weight of about 25 lbs/ream. In another example, the paperboard having a basis weight of from about 60 to about 330 lbs/ream, for example, from about 155 to about 265 lbs/ream. In one particular example, the paperboard has a basis weight of about 175 lbs/ream. The paperboard generally may have a thickness of from about 6 to about 30 mils, for example, from about 14 to about 24 mils. In one particular example, the paperboard has a thickness of about 16 mils. Any suitable paperboard may be used, for example, a solid bleached or solid unbleached sulfate board, such as SUS® board, commercially available from Graphic Packaging International.

The construct may be formed according to numerous processes known to those in the art, including using adhesive bonding, thermal bonding, ultrasonic bonding, mechanical stitching, or any other suitable process. Any of the various components used to form the construct may be provided as a sheet of material, a roll of material, or a die cut material in the shape of the construct to be formed (e.g., a blank).

It will be understood that with some combinations of elements and materials, the microwave energy interactive element may have a grey or silver color that is visually distinguishable from the substrate or the support. However, in some instances, it may be desirable to provide a construct having a uniform color and/or appearance. Such a construct may be more aesthetically pleasing to a consumer, particularly when the consumer is accustomed to packages or containers having certain visual attributes, for example, a solid color, a particular pattern, and so on. Thus, for example, the present disclosure contemplates using a silver or grey toned adhesive to join the microwave energy interactive element to the support, using a silver or grey toned support to mask the presence of the silver or grey toned microwave energy interactive element, using a dark toned substrate, for example, a black toned substrate, to conceal the presence of the silver or grey toned microwave energy interactive element, overprinting the metallized side of the polymer film with a silver or grey toned ink to obscure the color variation, printing the non-metallized side of the polymer film with a silver or grey ink or other concealing color in a suitable pattern or as a solid color layer to mask or conceal the presence of the microwave energy interactive element, or any other suitable technique or combination of techniques.

The disclosure may be understood further from the following example, which is not intended to be limiting in any manner.

Example

Figure 2:
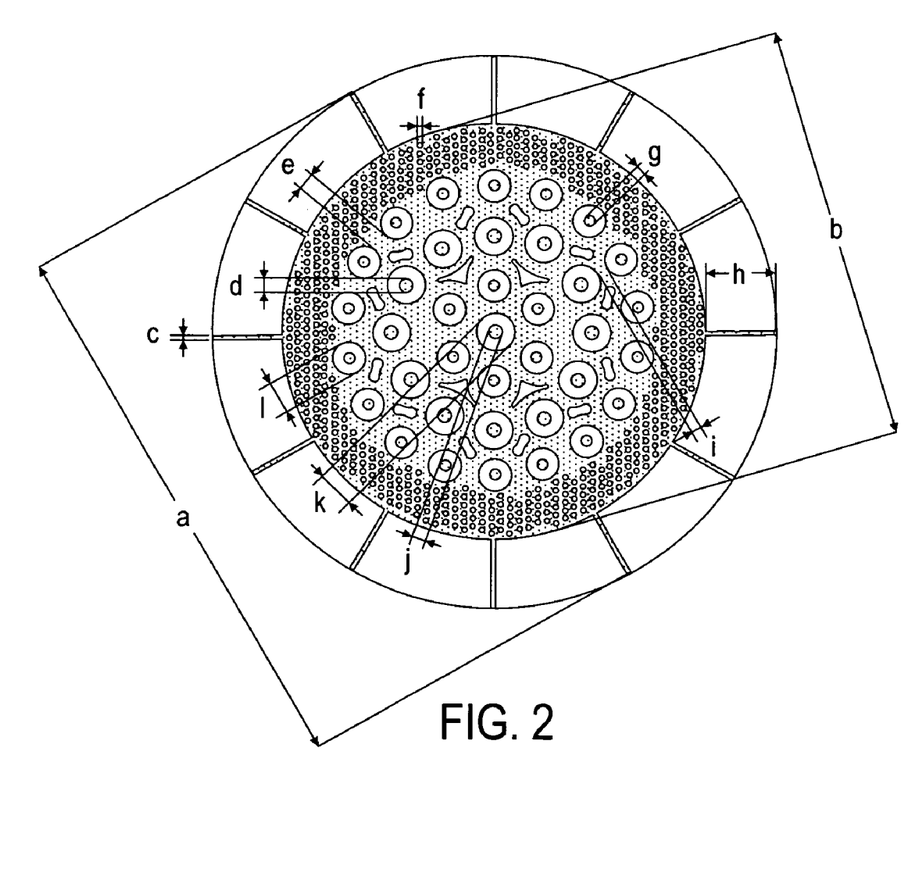
FIG. 2 schematically illustrates a construct similar to the construct illustrated schematically in FIGS. 1A-1H, used to evaluate the heating, browning, and/or crisping performance with various cookie doughs. More specifically.

Chocolate or regular cookie dough samples were placed on constructs similar to the construct schematically illustrated in FIGS. 1A-1H, with the following dimensions, as indicated on FIG. 2 (in inches): a=4.375; b=3.115; c=0.036; d=0.118; e=0.134; f=0.039; g=0.095; h=0.630; i=0.108; j=0.118; k=0.276; and l=0.236. The dough was heated on the respective construct in various 1000 W or 1100 W microwave ovens having a turntable for about 40 seconds. After allowing each cookie to cool for about one minute, the bottom of each cookie was examined and was suitably browned and crisped. The interior of each cookie was inspected and determined to be heated properly.

While the present invention is described herein in detail in relation to specific aspects and embodiments, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is illustrative only and is not intended, nor is to be construed, to limit the present invention or otherwise to exclude any such other embodiments, adaptations, variations, modifications, and equivalent arrangements of the present invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other. Further, various elements discussed with reference to the various embodiments may be interchanged to create entirely new embodiments coming within the scope of the present invention.

What is claimed is:

1. An apparatus for preparing a food item in a microwave oven, the apparatus comprising:
    microwave energy interactive material joined to a support layer, the microwave energy interactive material being arranged on the support layer to define a plurality of heating regions,
    wherein the plurality of heating regions include an inner heating region and an outer heating region, wherein
        the inner heating region comprises a substantially annular microwave energy transparent area within the microwave energy interactive material of the inner heating region, the substantially annular microwave energy transparent area being defined by an inner boundary and an outer boundary, wherein the inner boundary and the outer boundary each have a substantially circular shape, and wherein the inner boundary of the substantially annular microwave energy transparent area circumscribes a portion of the microwave energy interactive material of the inner heating region, and the outer heating region comprises a plurality of elongate microwave energy interactive material projections extending outwardly from the microwave energy interactive material of the inner heating region, wherein the support layer extends between and underlies the microwave energy interactive material projections.

2. The apparatus of claim 1, wherein
the substantially annular microwave energy transparent area of the inner heating region is a first substantially annular microwave energy transparent area of a plurality of substantially annular microwave energy transparent areas of the inner heating region, and
the substantially annular microwave energy transparent areas of the inner heating region are arranged as a plurality of concentric rings.

3. The apparatus of claim 2, wherein
the substantially annular microwave energy transparent areas of a first ring of the plurality of concentric rings have a major linear dimension, and
the substantially annular microwave energy transparent areas of a second ring of the plurality of concentric rings have a major linear dimension that differs from the major linear dimension of the substantially annular microwave energy transparent areas of the first ring.

4. The apparatus of claim 3, wherein the substantially annular microwave energy transparent areas of a third ring of the plurality of concentric rings have a major linear dimension approximately equal to the major linear dimension of the substantially annular microwave energy transparent areas of the first ring.

5. The apparatus of claim 4, wherein the inner heating region further comprises a plurality of substantially circular microwave energy transparent areas arranged around the third ring of substantially annular microwave energy transparent areas.

6. The apparatus of claim 5, wherein the substantially circular microwave energy transparent areas are arranged in a closely spaced, tiled configuration with one another.

7. The apparatus of claim 5, wherein the substantially circular microwave energy transparent areas have a major linear dimension that is less than the respective major linear dimensions of the substantially annular microwave energy transparent areas of each of the first ring, second ring, and third ring.

8. The apparatus of claim 7, wherein the portion of the microwave energy interactive material circumscribed by each substantially annular microwave energy transparent area of the inner heating region has a major linear dimension that is greater than the major linear dimension of the substantially circular microwave energy transparent areas of the inner heating region.

9. The apparatus of claim 1, wherein the elongate microwave energy interactive material projections of the outer heating region are substantially rectangular in shape.

10. The apparatus of claim 1, wherein the microwave energy interactive material comprises aluminum having an optical density of from about 0.15 to about 0.35.

11. The apparatus of claim 1, wherein the substantially annular microwave energy transparent area of the inner heating region is a first substantially annular microwave energy transparent area of a plurality of substantially annular microwave energy transparent areas of the inner heating region.

12. The apparatus of claim 11, wherein the plurality of substantially annular microwave energy transparent areas of the inner heating region are each defined by an inner boundary and an outer boundary, the inner boundary and the outer boundary being substantially circular in shape, wherein the inner boundary circumscribes a respective portion of the microwave energy interactive material of the inner heating region.

13. The apparatus of claim 1, in combination with the food item, wherein the food item overlies the plurality of heating regions.

14. An apparatus for preparing a food item in a microwave oven, the apparatus comprising:
a plurality of heating regions including a central region, a medial region, and a peripheral region, wherein the central region, medial region, and peripheral region each comprise microwave energy interactive material supported on a microwave energy transparent support layer, wherein the microwave energy interactive material is operative for converting at least a portion of impinging microwave energy into thermal energy,
wherein
the central region includes at least one substantially annular microwave energy transparent area circumscribed by the microwave energy interactive material of the central region, the substantially annular microwave energy transparent area being defined by an inner boundary and an outer boundary, wherein the inner boundary and the outer boundary comprise concentric circles, and wherein the inner boundary of the substantially annular microwave energy transparent area circumscribes a portion of the microwave energy interactive material, and
the medial region includes a plurality of substantially circular microwave energy transparent areas circumscribed by the microwave energy interactive material of the medial region, the substantially circular microwave energy transparent areas being arranged in tiled configuration around the central region, and
the peripheral region includes
a plurality of microwave energy interactive projections comprising the microwave energy interactive material of the peripheral region, the plurality of microwave energy interactive projections extending outwardly from the microwave energy interactive material of the medial region, and
a plurality of microwave energy transparent areas comprising the support layer extending between the microwave energy interactive projections.

15. The apparatus of claim 14, wherein
the at least one substantially annular microwave energy transparent area of the central region is a first substantially annular microwave energy transparent area of a plurality of substantially annular microwave energy transparent areas of the central region, and
the substantially annular microwave energy transparent areas of the central region are arranged as a plurality of substantially concentric rings surrounding a centermost annular microwave energy transparent area.

16. The apparatus of claim 15, wherein the central region further includes
a plurality of microwave energy transparent areas having a substantially triangular shape, and
a plurality of microwave energy transparent areas having a substantially bilobal shape.

17. The apparatus of claim 16, wherein
the plurality of substantially concentric rings includes a first ring, a second ring, and a third ring of substantially annular microwave energy transparent areas,
the plurality of microwave energy transparent areas having the substantially triangular shape is disposed between the first ring and the second ring of substantially annular microwave energy transparent areas, and
the plurality of microwave energy transparent areas having the substantially bilobal shape is disposed between the second ring and the third ring of substantially annular microwave energy transparent areas.

18. The apparatus of claim 17, wherein the substantially circular microwave energy transparent areas of the medial region are disposed between the third ring of substantially annular microwave energy transparent areas and the peripheral region.

19. The apparatus of claim 15, wherein
the central region, medial region, and peripheral region each have a respective area,
the plurality of substantially annular microwave energy transparent areas comprises about 25% to about 50% of the area of the central region,
the plurality of substantially circular microwave energy transparent areas comprises about 75% to about 85% of the area of the medial region, and
the plurality of microwave energy interactive projections comprises from about 1% to about 5% of the area of the peripheral region.

20. The apparatus of claim 14, wherein
the central region is substantially circular in shape, and
the medial region and the peripheral region are each substantially annular in shape.

21. The apparatus of claim 14, wherein the microwave energy interactive material comprises aluminum having a thickness of from about 60 to about 100 angstroms.

22. The apparatus of claim 14, wherein the at least one substantially annular microwave energy transparent area comprises a plurality of substantially annular microwave energy transparent areas of the central region.

23. The apparatus of claim 22, wherein the plurality of substantially annular microwave energy transparent areas is of the central region are each defined by an inner boundary and an outer boundary, wherein the inner boundary and the outer boundary comprise concentric circles, and wherein the inner boundary circumscribes a respective portion of the microwave energy interactive material of the central region.

24. The apparatus of claim 14, in combination with the food item, wherein the food item overlies the plurality of heating regions.

25. An apparatus for preparing a food item in a microwave oven, the apparatus comprising:
a plurality of heating regions including
an inner heating region comprising microwave energy interactive material that circumscribes a plurality of substantially annular microwave energy transparent areas, the substantially annular microwave energy transparent areas each being defined by an inner boundary and an outer boundary, wherein the inner boundary of each substantially annular microwave energy transparent area circumscribes a portion of the microwave energy interactive material, and
an outer heating region comprising a plurality of elongate projections, the plurality of elongate projections comprising microwave energy interactive material extending outwardly from the microwave energy interactive material of the inner heating region,
wherein
the microwave energy interactive material of each of the inner heating region and the outer region is supported on a microwave energy transparent support layer, and
the plurality of elongate projections of the outer heating region are spaced apart from one another on the microwave energy transparent support layer to define microwave energy transparent areas between the plurality of elongate projections.

26. The apparatus of claim 25, in combination with the food item, wherein a lowermost surface of the food item is in a facing relationship with the plurality of heating regions.

27. The apparatus of claim 25, wherein
the inner heating region comprises a central heating region and a medial heating region, the medial region being positioned between the central heating region and the outer heating region,
the central heating region comprises the plurality of substantially annular microwave energy transparent areas circumscribed by the microwave energy interactive material of the inner heating region, and
the medial heating region comprises a plurality of substantially circular microwave energy transparent areas arranged in tiled configuration around the central heating region.

28. The apparatus of claim 25, wherein the substantially annular microwave energy transparent areas of the inner heating region are arranged in a plurality of concentric rings.

29. The apparatus of claim 28, wherein
the plurality of concentric rings includes a first ring and a second ring,
the substantially annular microwave energy transparent areas of the first ring of have a major linear dimension, and
the substantially annular microwave energy transparent areas of the second ring have a major linear dimension that differs from the major linear dimension of the substantially annular microwave energy transparent areas of the first ring.

30. The apparatus of claim 29, wherein
the plurality of concentric rings includes a third ring, and
the substantially annular microwave energy transparent areas of the third ring have a major linear dimension approximately equal to the major linear dimension of the substantially annular microwave energy transparent areas of the first ring.

31. The apparatus of claim 25, wherein the outer heating region defines a peripheral edge of the apparatus, wherein the peripheral edge is substantially circular in shape.

32. An apparatus for preparing a food item in a microwave oven, the apparatus comprising:
a plurality of heating regions for underlying the food item, so that a lowermost surface of the food item is in a facing relationship with the plurality of heating regions, the plurality of heating regions including an inner heating region and an outer heating region, wherein
the inner heating region comprises a susceptor and a plurality of substantially annular microwave energy transparent areas within the susceptor, the substantially annular microwave energy transparent areas each being defined by an inner boundary and an outer boundary, wherein the inner boundary and the outer boundary each have a substantially circular shape, and wherein the inner boundary of each substantially annular microwave energy transparent area circumscribes a respective portion of the susceptor, and the outer heating region comprises a plurality of elongate susceptor projections extending outwardly from the susceptor of the inner heating region.

33. The apparatus of claim 32, wherein the inner heating region comprises a central heating region and a medial heating region, the medial heating region being positioned between the central heating region and the outer heating region, wherein the central heating region comprises the plurality of substantially annular microwave energy transparent areas, and the medial heating region comprises a plurality of substantially circular microwave energy transparent areas arranged in tiled configuration around the central heating region.

34. The apparatus of claim 32, wherein the substantially annular microwave energy transparent areas of the inner heating region are arranged in a plurality of concentric rings.

35. The apparatus of claim 34, wherein
the plurality of concentric rings includes a first ring and a second ring,
the substantially annular microwave energy transparent areas of the first ring of have a major linear dimension, and
the substantially annular microwave energy transparent areas of the second ring have a major linear dimension that differs from the major linear dimension of the substantially annular microwave energy transparent areas of the first ring.

36. The apparatus of claim 35, wherein
the plurality of concentric rings includes a third ring, and
the substantially annular microwave energy transparent areas of the third ring have a major linear dimension approximately equal to the major linear dimension of the substantially annular microwave energy transparent areas of the first ring.

37. The apparatus of claim 32, wherein the susceptor of the inner heating region and the susceptor projections of the outer region are supported on a microwave energy transparent support layer.

38. The apparatus of claim 37, wherein the microwave energy transparent support layer extends between and underlies the susceptor projections of the outer heating region.

39. The apparatus of claim 32, in combination with the food item, wherein the lowermost surface of the food item is in a facing relationship with the plurality of heating regions.

40. An apparatus for preparing a food item in a microwave oven, the apparatus comprising:
a plurality of heating regions for underlying the food item, so that a lowermost surface of the food item is in a facing relationship with the plurality of heating regions, the plurality of heating regions including a central region, a medial region, and a peripheral region, the central region and medial region each comprising a layer of microwave energy interactive material operative for converting at least a portion of impinging microwave energy into thermal energy,
wherein
the central region includes a plurality of substantially annular microwave energy transparent areas in the layer of microwave energy interactive material, the substantially annular microwave energy transparent areas each being defined by an inner boundary and an outer boundary, wherein the inner boundary and the outer boundary comprise concentric circles, and wherein the inner boundary of each substantially annular microwave energy transparent areas circumscribes a respective portion of the layer of microwave energy interactive material, and the medial region includes a plurality of substantially circular microwave energy transparent areas in the layer of microwave energy interactive material, the substantially circular microwave energy transparent areas being arranged in tiled configuration around the central region, and the peripheral region includes a plurality of microwave energy interactive projections comprising microwave energy interactive material, the plurality of microwave energy interactive projections extending outwardly from the layer of microwave energy interactive material of the medial region.

41. The apparatus of claim 40, wherein the plurality of substantially annular microwave energy transparent areas are arranged as a plurality of substantially concentric rings surrounding a centermost substantially annular microwave energy transparent area.

42. The apparatus of claim 41, wherein the central region further includes
a plurality of microwave energy transparent areas having a substantially triangular shape, and
a plurality of microwave energy transparent areas having a substantially bilobal shape.

43. The apparatus of claim 42, wherein
the plurality of substantially concentric rings includes a first ring, a second ring, and a third ring of substantially annular microwave energy transparent areas,
the plurality of microwave energy transparent areas having the substantially triangular shape is disposed between the first ring and the second ring of substantially annular microwave energy transparent areas, and
the plurality of microwave energy transparent areas having the substantially bilobal shape is disposed between the second ring and the third ring of substantially annular microwave energy transparent areas.

44. The apparatus of claim 43, wherein the plurality of substantially circular microwave energy transparent areas of the medial region are disposed between the peripheral region and the third ring of substantially annular microwave energy transparent areas of the central region.

45. The apparatus of claim 40, wherein
the central region is substantially circular in shape, and
the medial region and the peripheral region are annular in shape.

46. The apparatus of claim 40, wherein
the central region, medial region, and peripheral region each have a respective area,
the substantially annular microwave energy transparent areas comprise about 25% to about 50% of the area of the central region,
the substantially circular microwave energy transparent areas comprise about 75% to about 85% of the area of the medial region, and
the microwave energy interactive projections comprise from about 1% to about 5% of the area of the peripheral region.

47. The apparatus of claim 40, wherein
the plurality of heating regions are defined by configuring the layer of microwave energy interactive material on a microwave energy transparent support layer, and
the support layer extends between and underlies the plurality of microwave energy interactive projections of the peripheral region.

48. The apparatus of claim 40, wherein
the plurality of heating regions are defined by configuring the layer microwave energy interactive material on a microwave energy transparent support layer, and the plurality of microwave energy interactive projections of the peripheral region are spaced apart from one another on the microwave energy transparent support layer to define microwave energy transparent areas between the plurality of microwave energy interactive projections.

49. The apparatus of claim 40, in combination with the food item, wherein the food item overlies the plurality of heating regions.

* * * * *